US011461363B2

(12) United States Patent
Yoo et al.

(10) Patent No.: US 11,461,363 B2
(45) Date of Patent: Oct. 4, 2022

(54) MEMORY ALLOCATION AND DEALLOCATION MECHANISM TO REDUCE FRAGMENTATION AND ENHANCE DEFRAGMENTATION PERFORMANCE

(71) Applicant: SAP SE, Walldorf (DE)

(72) Inventors: Seungho Yoo, Seoul (KR); Ji Hoon Jang, Seongnam-si (KR); Seyeong Bae, Seoul (KR); Yong Sik Kwon, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 16/835,549

(22) Filed: Mar. 31, 2020

(65) Prior Publication Data

US 2021/0311962 A1 Oct. 7, 2021

(51) Int. Cl.
  *G06F 16/20* (2019.01)
  *G06F 16/27* (2019.01)
  *G06F 16/23* (2019.01)
(52) U.S. Cl.
  CPC .......... *G06F 16/27* (2019.01); *G06F 16/2379* (2019.01)
(58) Field of Classification Search
  None
  See application file for complete search history.

(56) References Cited

U.S. PATENT DOCUMENTS

| 11,386,120 | B2* | 7/2022 | Cantwell | G06F 16/27 |
| 2010/0228928 | A1* | 9/2010 | Asnaashari | G06F 12/0246 711/154 |
| 2012/0096217 | A1* | 4/2012 | Son | G06F 16/1847 711/103 |
| 2013/0326161 | A1* | 12/2013 | Cohen | G06F 3/0679 711/154 |
| 2019/0036891 | A1* | 1/2019 | Crofton | G06F 16/27 |
| 2020/0293506 | A1* | 9/2020 | Gupta | G06F 16/24568 |

* cited by examiner

*Primary Examiner* — Jau Shya Meng
(74) *Attorney, Agent, or Firm* — Fish & Richardson P.C.

(57) ABSTRACT

Methods, systems, and computer-readable storage media for receiving a first storage request indicating a first type of data and a first size, identifying a first sub-space based on the first type, the first sub-space including a dense group of dense segments and a sparse group of sparse segments, and determining that the dense group of the first sub-space is absent a dense segment to store data of the first storage request based on the first size, and in response: determining whether the sparse group of the first sub-space includes a sparse segment to store the data of the first storage request based on the first size, and storing the data of the first storage request to the sparse group of the first sub-space in response to determining that the sparse group of the first sub-space includes a sparse segment to store the data of the first storage request.

20 Claims, 6 Drawing Sheets

MEMORY ALLOCATION AND DEALLOCATION MECHANISM TO REDUCE FRAGMENTATION AND ENHANCE DEFRAGMENTATION PERFORMANCE

BACKGROUND

In data storage, memory fragmentation (also referred to herein as fragmentation) is a common problem. Fragmentation refers to a situation where the memory in use is less than the allocated memory. Fragmentation can be caused by instances, in which the required memory cannot be provided even though there is enough total free memory (e.g., there is insufficient continuous memory to store particular data that is to be stored). Fragmentation in database storage results in wasted memory and degrades overall data access performance. For example, fragmentation results in an increased amount of memory to be accessed to retrieve required data than a well-utilized database system (e.g., a database system with no fragmentation or less fragmentation).

Defragmentation refers to a process to reduce fragmentation. In general, fragmentation is performed by moving (deleting and inserting) data from sparse pages to dense pages, a page being a grouping of memory. In some instances, defragmentation can fail when data cannot be moved from a sparse page to a dense page. This can be problematic, because each time defragmentation is performed, technical resources (e.g., processing, memory) are expended. Further, defragmentation can result in data being unavailable until the defragmentation is complete. That is, data can be effectively brought offline during defragmentation, such that production use of the data is prohibited. Accordingly, it is desirable to reduce the amount of fragmentation occurring in memory systems, as well as the frequency at which defragmentation is performed.

SUMMARY

Implementations of the present disclosure are directed to memory management for database systems. More particularly, implementations of the present disclosure are directed to a memory management scheme that reduces fragmentation and enhances defragmentation performance in database systems.

In some implementations, actions include receiving a first storage request to store data in computer-memory, the first storage request indicating a first type of data of a plurality of types of data and a first size, identifying a first sub-space of a plurality of sub-spaces based on the first type, the first sub-space including a dense group of dense segments and a sparse group of sparse segments, and determining that the dense group of the first sub-space is absent a dense segment to store data of the first storage request based on the first size, and in response: determining whether the sparse group of the first sub-space includes a sparse segment to store the data of the first storage request based on the first size, and storing the data of the first storage request to the sparse group of the first sub-space in response to determining that the sparse group of the first sub-space includes a sparse segment to store the data of the first storage request. Other implementations of this aspect include corresponding systems, apparatus, and computer programs, configured to perform the actions of the methods, encoded on computer storage devices.

These and other implementations can each optionally include one or more of the following features: actions further includes receiving a second storage request to store data in the computer-memory, the second storage request indicating the first type and a second size, identifying the first sub-space of a plurality of sub-spaces based on the first type, and determining that the dense group of the first sub-space is absent a dense segment to store data of the second storage request based on the second size and that the first sub-space is absent a sparse segment to store the data of the second storage request based on the second size, and in response: determining whether a sparse group of a second sub-space in the plurality of sub-spaces includes a sparse segment to store the data of the second storage request based on the second size, and storing the data of the second storage request to the sparse group of the second sub-space in response to determining that the sparse group of the second sub-space includes a sparse segment to store the data of the second storage request; the second sub-space is associated with a second type of data, the second type being inferior to the first type in a type order; the second sub-space is associated with a second type of data, the second type being superior to the first type in a type order; actions further include receiving a third storage request to store data in the computer-memory, the third storage request indicating the first type and a third size, identifying the first sub-space of a plurality of sub-spaces based on the first type, and determining that the first sub-space is absent a segment to store data of the third storage request based on the third size, and in response: determining whether a sparse segment in one or more other sub-spaces of the plurality of sub-spaces is able to store the data of the third storage request based on the third size, and determining that each of the one or more other sub-spaces is absent a sparse segment to store the data of the third storage request, and in response: allocating a segment and a page in the first sub-space to store the data of the third storage request; actions further include identifying a segment as one of a dense segment and a sparse segment based on a ratio of a number of used pages in the segment and a number of free pages; and the number of available pages includes an average number of free pages across all segments in a sub-space.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to memory management for database systems. More particularly, implementations of the present disclosure are directed to a memory management scheme that reduces fragmentation and enhances defragmentation performance in database systems. Implementations can include actions of receiving a first storage request to store data in computer-memory, the first storage request indicating a first type of data of a plurality of types of data and a first size, identifying a first sub-space of a plurality of sub-spaces based on the first type, the first sub-space including a dense group of dense segments and a sparse group of sparse segments, and determining that the dense group of the first sub-space is absent a dense segment to store data of the first storage request based on the first size, and in response: determining whether the sparse group of the first sub-space includes a sparse segment to store the data of the first storage request based on the first size, and storing the data of the first storage request to the sparse group of the first sub-space in response to determining that the sparse group of the first sub-space includes a sparse segment to store the data of the first storage request.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Figure 1:
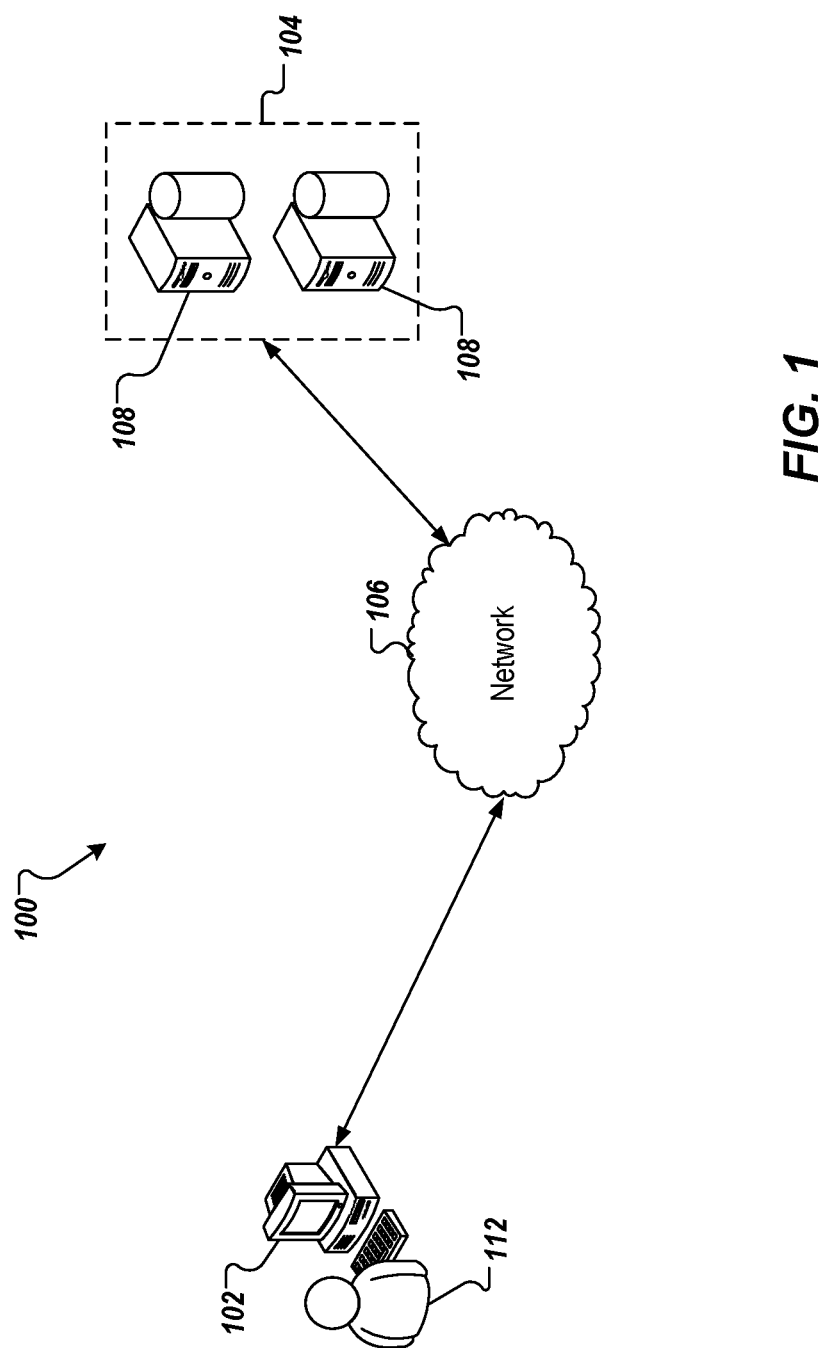
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). Further, the server system 104 can execute the memory allocation and deallocation mechanism that reduces fragmentation and enhances defragmentation performance in database systems of the present disclosure, as described in further detail herein.

To provide further context for implementations of the present disclosure, and as introduced above, To provide further context for implementations of the present disclosure, and as introduced above, memory management schemes are used in database systems to manage storage of data in computer-readable/-writable memory (referred to as memory herein). In some examples, data is stored in tables within the database system, each table including columns and rows. In some examples, each column represents a respective field, and each row is a record that includes values for the field(s) (e.g., a value is stored in each cell corresponding to a respective field-row pair). By way of non-limiting example, an example portion of a table is depicted below in Table 1.

TABLE 1

Example Portion of Example Table

| Customer Name | Country | Account No. |
|---|---|---|
| Acme Ltd. | US | 1234 |
| Corp. AG | DE | 4321 |
| . . . | . . . | . . . |

In the example of Table 1, example fields include Customer Name, Country, and Account No., and row values include Acme Ltd., US, 1234, Corp. AG, DE, and 4321.

Each table of the database system is stored in memory using a table store mode. Example table store modes include row store (RowStore) and column store (ColumnStore). Implementations of the present disclosure are described in further detail herein with reference to row store. Using row store, values are stored sequentially in an array of blocks of memory. For example, memory can be described as a continuous array of blocks, each block storing a single value of data (e.g., a value from a cell of a table). Each row of data is stored one after another in sequence along the array of blocks. Again, using Table 1 as a non-limiting example, row store of the values of Table 1 would result in the following example sequence of blocks in memory:

| ... | Acme Ltd. | U.S. | 1234 | Corp. AG | DE | 4321 | ... |
|---|---|---|---|---|---|---|---|

Example Memory Array

Although the example memory array above is associated with a fixed length memory area, it is contemplated that, for variable length data, a variable length memory area can be implicated. In some examples, a record including both fixed length data and variable length data can be stored in multiple memory areas (e.g., both fixed length memory area and variable length memory area). Different table store modes have different characteristics. For example, although having a greater memory footprint, row store enables more rapid transaction (e.g., query) processing and more rapid writing to memory than column store.

During operation of the database system, memory is allocated from an operating system (OS) before the data is actually stored to memory. In many instances, only part of the memory that has been allocated is actually used to store the data. In addition, the memory is managed using a memory management scheme that can include multiple levels, each level having respective restrictions due to internal memory management policies and/or mechanisms.

Figure 2:
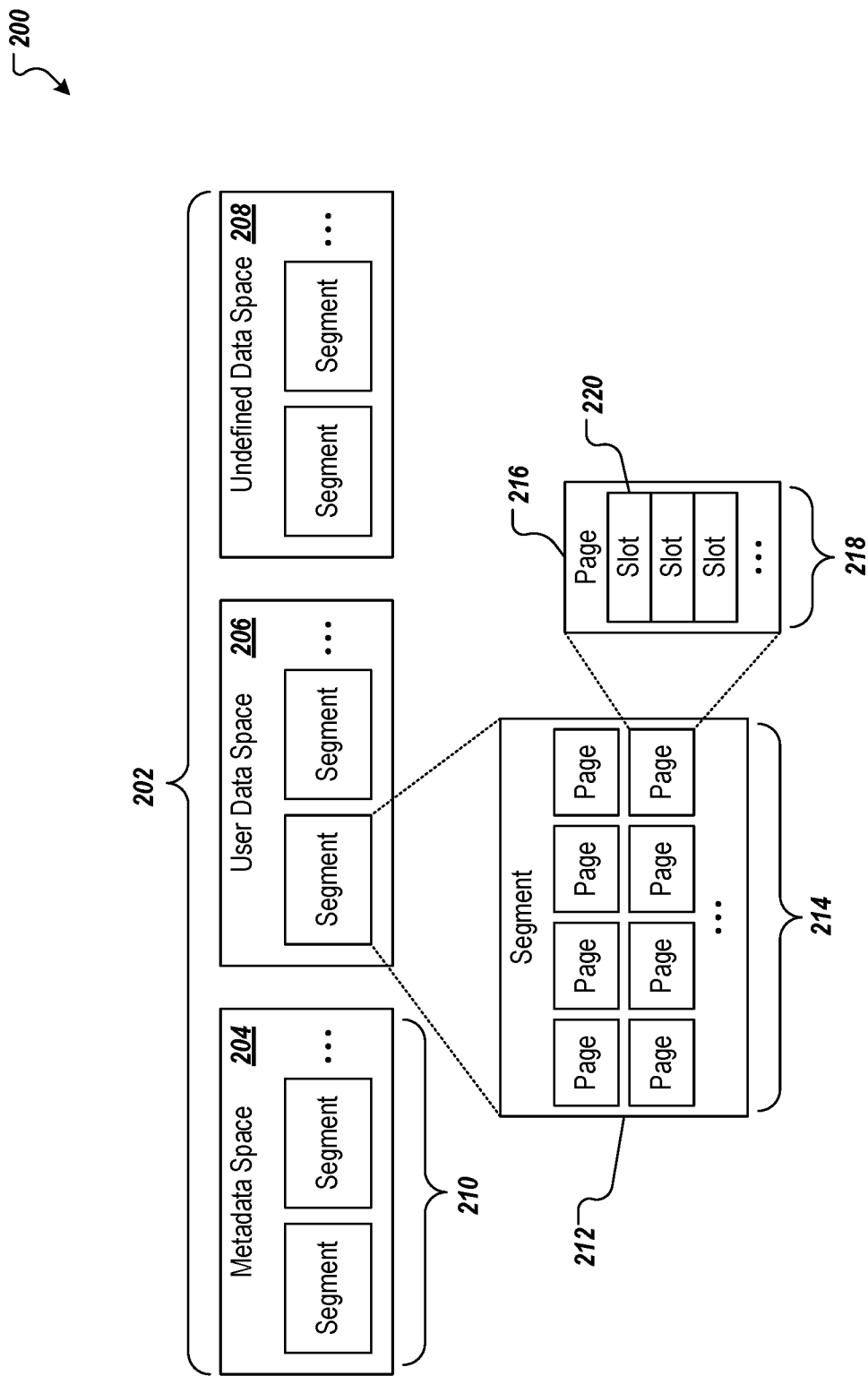
FIG. 2 depicts a graphical representation of an example memory management scheme of an example database system.

FIG. 2 depicts a graphical representation of an example memory management scheme 200 of an example database system. More particularly, the example memory management scheme 200 is used for row store in the SAP HANA database system, introduced above. In the example memory management scheme 200, memory is managed in a set of levels that are hierarchically arranged from largest size to smallest size.

As depicted in FIG. 2, the example memory management scheme 200 includes a data space 202 that includes a metadata space 204, a user data space 206, and an undefined data space 208. Each data space 204, 206, 208 includes a set of segments 210 (e.g., metadata segments, user data segments, and undefined data segments, respectively). Each set of segments 210 includes one or more segments 212, each segment 212 includes a set of pages 214. Each set of pages 214 includes one or more pages 216. Each page 216 includes a set of slots 218. Each set of slots includes one or more slots 220, each slot 220 storing data. The slots 220 are the basic unit for operation of the database system.

Memory is allocated/deallocated by the OS by segment, which is a large continuous memory space. Using row store as a continued example, row store manages memory by page, which is part of the allocated segment. Deallocation only occurs when all pages of the to-be-deallocated segment are unused (i.e., there is no used page in the segment). In other words, a segment cannot be freed, if it has any used pages, a used page being a page having at least one used slot (i.e., a slot storing data that is still in use).

With regard to allocating memory, one or more processes for allocating memory can be used. An example process for allocating memory in row store is described in further detail herein. When a slot is requested for storing data, the memory manager tries to find a page to use from the already allocated pages. In some examples, the memory manager uses a slot requirement to determine whether a particular page from allocated pages is available. The slot requirement can be provided as the requested slot size (i.e., the amount of memory required to store the data). Further, the space (data space) is matched to slot usage, metadata or user data (tables), and the type of data (described in further detail herein) should be matched. For example, fixed length data and variable length of data should use different page. The data of different tables should be stored in different pages, and the size of slots should be matched to the requested slot size.

In some examples, the memory manager determines whether a sparse page or a cached page is available in an allocated segment. A sparse page generally refers to a page that has a slot utilization that is less than a threshold slot utilization (e.g., a page that has at least one empty slot and at least one used slot). In some examples, slot utilization is calculated as a percentage of used slots (relative to total number of slots in the page). A cached page refers to a page within an allocated segment that is available. If there are no pages within the allocated segments to meet the slot requirement, the memory manager tries to get a new page from the allocated segments. In some examples, the memory manager determines whether any sparse segment is available to meet the storage need. A sparse segment generally refers to a segment that has a page utilization that is less than a threshold page utilization (e.g., a segment that has at least one empty page and at least one used page). In some examples, page utilization is calculated as a percentage of used pages (relative to total number of pages that can be included in the segment page). If there is no sparse segment to allocate a page, the memory manager allocates a segment (new segment) and allocates a page (new page) from the (new) segment.

In some examples, a set of data types is provided and includes types that content of the data is assigned to. Example types include type A, type B, type C, and type Q. In some examples, data that has a fixed length (fixed size) is type A data, data that has a variable length (variable size) and include metadata identifying an owner of the data (e.g., the record that the data belongs to) is type B data, and data that has a variable length (variable size), but is absent metadata identifying an owner of the data is type C data. In some examples, a record of a table includes one or multiple slots including a slot for fixed length data and one or more slots for variable length data (or no variable part slot is also possible). In some implementations, by defining data types, the online defragmentation process moves the data by deleting record and inserting the same record to another place and requires identification, of which record should be moved to remove a target slot. The record can be relatively easily identified with fixed length data slots. However, for variable length data slots, an indirect way for type B data and full table scan for type C data is used in order to find the target record.

In some examples, type Q data is miscellaneous data that is not used in transactions. Type Q data can be described as quarantined memory, which is not expected, but exists because of a bug or other exceptional situation (e.g., leaked memory).

In some examples, a type order is provided as type A, type B, then type C (e.g., type A>type B>type C). In some examples, a type of a page is determined based on the type of the data stored therein, and a type of a segment is determined based on the types of the pages therein. For example, if a segment has any type C page, then the segment type is determined to be type C. If a segment has no type C pages and has one or more type B pages, then the segment type is determined to be type B. If a segment has only type A pages, then segment type is determined to be type A.

In terms of defragmentation, memory storing type Q data is not defragmented. In some examples, segments of type A have better defragmentation performance than segments of type B, and segments of type B have better defragmentation performance than segments of type C. In general, defragmentation performance can be defined in terms of amount of memory that is defragmented, a time required to defragment, and/or technical resources (e.g., CPU) required to execute the defragmentation.

Figure 3:
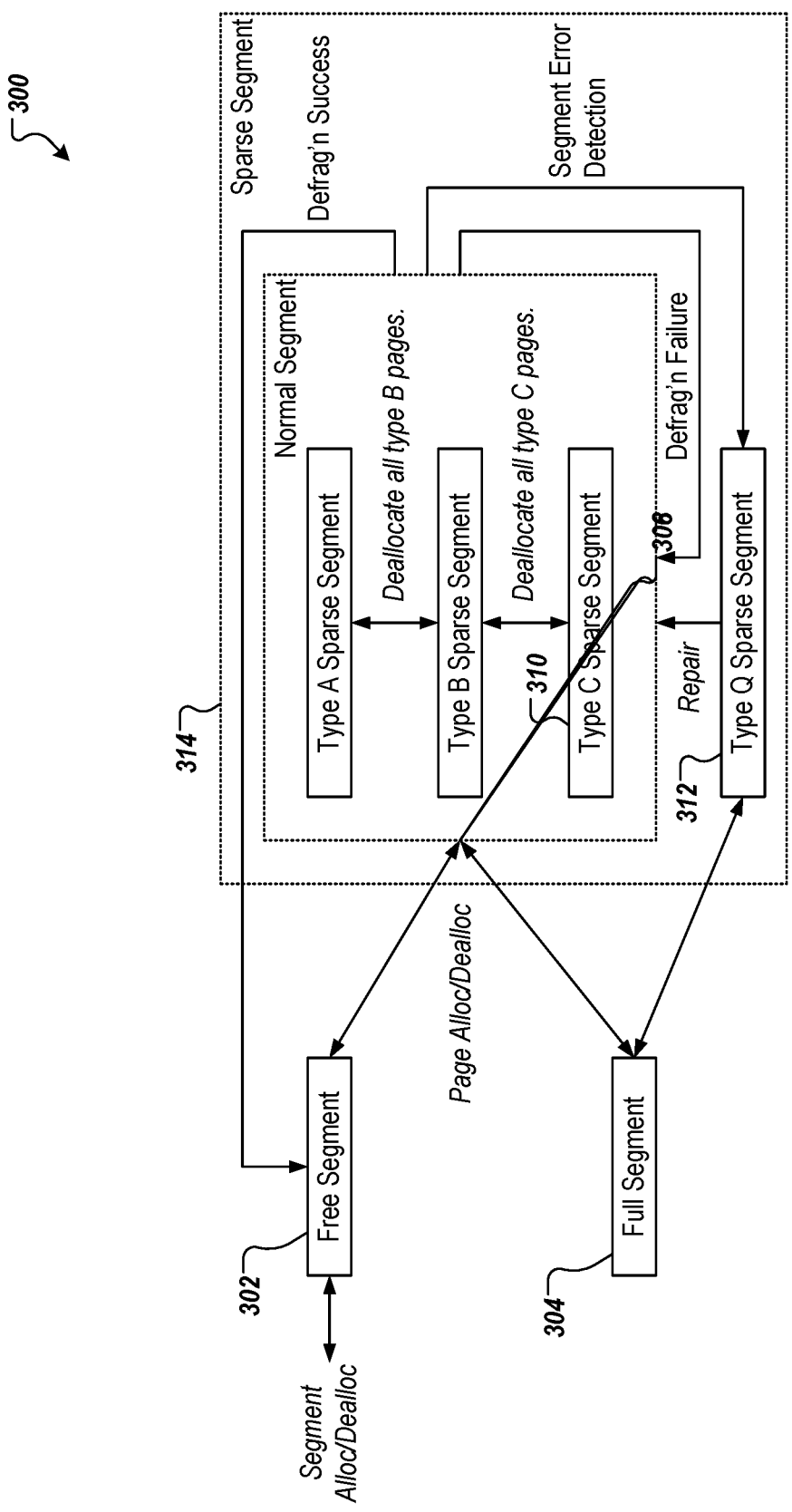
FIG. 3 depicts a graphical representation of an example segment type transition for the example memory management scheme of FIG. 2.

FIG. 3 depicts a graphical representation of an example segment type transition 300 for the example memory management scheme of FIG. 2. The example segment type transition 300 depicts how a type of a segment can change.

As depicted in FIG. 3, a free segment 302 that is transited from a new memory allocation or all data of all pages in the segment is deleted, which can occur as a result of data manipulation or a defragmentation process. Once a page of the free segment 302 is used by database system, the free segment transitions to being classified as a sparse segment 314 and a segment type is determined as the type of data (e.g., A, B, C). Accordingly, the segment is one of a type A sparse segment 306, a type B sparse segment 308, and a type C sparse segment. After the segment 302 is classified as a sparse segment 314, the segment type can be changed among 306, 308, 310 as data insertion and/or deletion transactions occur. If data insertion causes all pages in the segment to become full, then the segment transitions to be a full segment 304. If defragmentation success to make a segment of sparse segment 314 empty, the segment transitions to be a free segment 302 and possibly to be deallocated. If defragmentation fails to empty the sparse segment, then the segment remains in a sparse segment 314 with proper type. If the unexpected page is detected during defragmentation, the segment containing the page is moved to type Q sparse segment 312.

In data storage, memory fragmentation (also referred to herein as fragmentation) is a common problem. Fragmentation refers to a situation where the memory in use is less than the allocated memory. Fragmentation can be caused by instances, in which the required memory cannot be provided even though there is enough total free memory (e.g., there is insufficient continuous memory to store particular data that is to be stored). Fragmentation in database storage results in wasted memory and degrades overall data access performance. For example, fragmentation results in an increased amount of memory to be accessed to retrieve required data than a well-utilized database system (e.g., a database system with no fragmentation or less fragmentation).

Using row store as a non-limiting example, fragmentation usually occurs because the deallocation of one or more segments is not possible even though there is larger free memory than a segment size (e.g., there are many sparse segments, each only having a few used pages). This memory status (fragmented) is caused by the random deletion of used memory. To be specific, although the allocated memory is used continuously at the beginning, the deletion happens at any point of the used memory, and results in sparse segments over time.

Defragmentation refers to a process to reduce fragmentation. In general, fragmentation is performed by moving (deleting and inserting) data from sparse pages to dense pages. Using row store as a non-limiting example, defragmentation is performed by moving used pages from the segments with a lower number of used pages to other segments. In this manner, segments can be emptied and deallocated. An example defragmentation can include calculating a number of segments that can be freed (e.g., segments, for which all used pages can be moved to other segments), select a set of segments to be freed (a set of target segments), move used memory of target segments to the remaining segments, and deallocate each target segment, if the target segment is empty after moving the used memory.

From the example process for defragmentation provided above, there are several factors that affect defragmentation performance. One factor that affects the defragmentation performance, is the cost (i.e., technical cost in terms of resources expended to perform) to identify the segments that are to be included in the set of target segments. Another factor is the size of the data that is to be moved during defragmentation. Further, if defragmentation fails, the process is retried, which results in the above-described costs being expended again to reduce fragmentation.

Another factor, which is directly related to segment type categorization (A, B, C, Q), is the cost to identify affected database tables. Affected database tables in segments of type A and type B can be identified instantly. However, a full database scan at the record level is required to identify affected tables in segments of type C. Affected tables need to be identified, because metadata of affected tables needs to be read to move their records.

Different types of defragmentation can be provided. Example types include offline defragmentation and online defragmentation. Offline defragmentation refers to a defragmentation process that is executed while the database system is offline. That is, the database system is taken out of production use (i.e., the database system is not in service and no transactions can be performed). Online defragmentation refers to a defragmentation process that is executed while the database system is online. That is, the database system continues to operate in production use (i.e., active users and workloads). Offline defragmentation runs in isolation, and there is no need to consider complex table locking, record locking or other multi-version concurrency control (MVCC). Consequently, offline defragmentation is more effective in defragmenting memory than online defragmentation. However, by its nature, offline defragmentation requires service down-time, which is not always acceptable (e.g., some database systems require availability 24/7).

In contrast, and as noted above, online defragmentation is performed while the database system is running. Consequently, online defragmentation is more complex as than offline defragmentation, because locking and MVCC need to be considered. To account for this, online defragmentation typically locks tables using exclusive lock (X-lock). X-lock guarantees a table or a record, which is being or going to be moved by the online defragmentation process, is not manipulated by another transaction while the lock is acquired. That is, the X-lock blocks any data manipulation language (DML) transactions (e.g., DML statements DELETE, INSERT and UPDATE) from being executed. X-lock also guarantees that all records of the table are visible to the lock acquirer (otherwise, table lock could not be acquired). However, in a wide sense, using X-lock is not a real online operation, because all updates are blocked for the table while executing defragmentation. That is, using X-lock, respective tables are effectively brought offline during the defragmentation process.

In view of the above context, implementations of the present disclosure provide a memory management mechanism for memory allocation and deallocation to reduce fragmentation and enhance the performance of defragmentation. More particularly, and as described in further detail herein, implementations of the present disclosure provide a sparse segment management and free page allocation mechanism to reduce fragmentation and enhance the performance of the defragmentation process.

Figure 4:
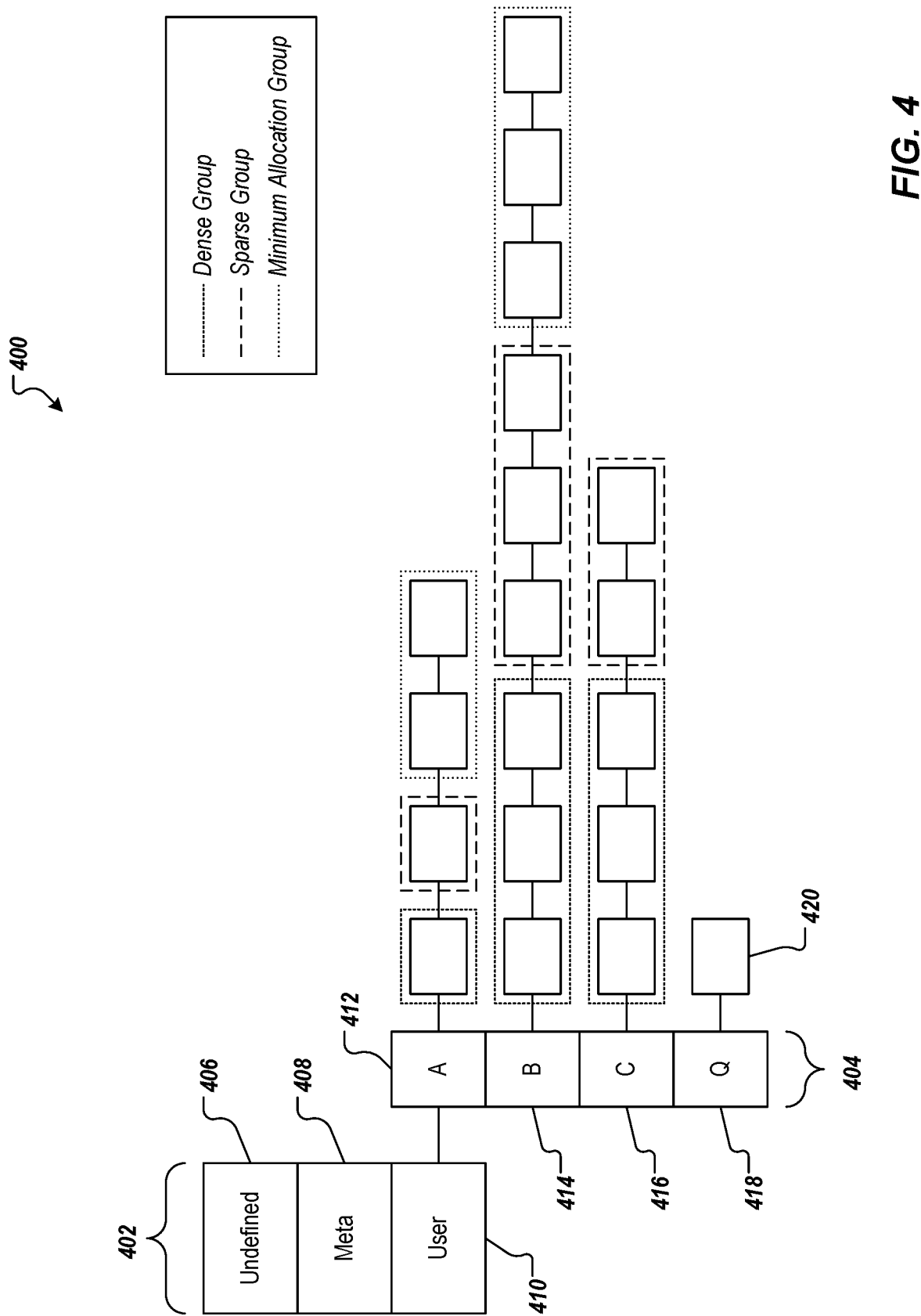
FIG. 4 depicts a graphical representation of an example sparse segment management in accordance with implementations of the present disclosure.

FIG. 4 depicts a graphical representation of an example sparse segment management 400 in accordance with implementations of the present disclosure. In the example of FIG. 4, a data space 402 includes an undefined data space 406, a metadata space 408, and a user data space 410, as similarly described above with reference to FIG. 2. In the example of FIG. 4, the user data space 410 includes a set of sub-spaces 404, each sub-space corresponding to a respective data type. For example, the set of sub-spaces includes a sub-space 412 for data of type A, a sub-space 414 for data of type B, a sub-space 416 for data of type C, and a sub-space 418 for data of type Q (quarantine). Each sub-space 412, 414, 416, 418 includes one or more segments 420, within which data (of the respective type) is stored. As similarly described above with reference to FIG. 2, each segment 420 includes a set of pages, each set of pages includes one or more pages, each page includes a set of slots, each slot being the basic unit for operation of the database system. As described herein, each segment 420 is bound to the data space (undefined data space 406, metadata space 408, user data space 410) and respective sub-space (e.g., the sub-spaces 412, 414, 416, 418).

In accordance with implementations of the present disclosure, the sparse segment management is conducted for each data space 406, 408, 410. In some implementations, each sub-space 412, 414, 416 is provided as a list of segments 420, each segment 420 being defined as one of a dense, sparse, and minimum allocations. In some examples, each sub-space 412, 414, 416 provides an order of segments based on type of segment (e.g., dense, sparse, minimum allocation). More particularly, the sub-spaces 412, 414, 416 can each include a dense group of dense segments, a sparse group of sparse segments, and a minimum allocation group of segments for allocation (e.g., in instances where a new page is to be allocated). In some examples, the sub-space 418 does not differentiate between types of segments.

In some examples, segments are provided in the minimum allocation group in response to requests received through an application programming interface (API), which can be called during defragmentation. In some examples, defragmentation can set a segment as a minimum allocation segment to reserve allocating a page from the segment until the next defragmentation, which will retry to deallocate the segment. In the example of FIG. 4, a defragmentation process (e.g., executed immediately previous to the state depicted in FIG. 4) set two segments of type A data and a segment of type B data as minimum allocation, but it did not set a segment of type C as minimum allocation.

In some examples, a sparse segment is defined as a segment having a page availability that is greater than a threshold page availability. In a first example, page availability is calculated as a ratio of a number of free pages within a segment to a total number of pages in the segment, a free page being a page that does not contain any data therein. In some examples, a dense segment is defined as a segment having a page availability that is less than the threshold page availability. The following example relationship is provided:

$$\frac{n_i}{N_i} > \text{threshold} \mid S_i = \text{sparse}$$

$$\frac{n_i}{N_i} \leq \text{threshold} \mid S_i = \text{dense}$$

where i is a counter indicating a particular segment ($i^{th}$ segment) in a set of segments (e.g., $S_1, \ldots, S_m$, where m is the total number of segments in the set of segments and $1 \leq i \leq m$), $n_i$ is the number of free pages in the $i^{th}$ segment, and $N_i$ is the total number of pages in the $i^{th}$ segment.

In a second example, page availability is calculated as a ratio of a number of free pages within a segment to an average number of free pages across all segments, a free page being a page that does not contain any data therein. In some examples, a dense segment is defined as a segment having a page availability that is less than the threshold page availability. The following example relationship is provided:

$$\frac{n_i}{N_{AVG}} > \text{threshold} \mid S_i = \text{sparse}$$

$$\frac{n_i}{N_{AVG}} \leq \text{threshold} \mid S_i = \text{dense}$$

where $N_{AVG}$ is the average number of free pages across all segments in the set of segments. In some examples, $N_{AVG}$ can be determined based on the following example relationship:

$$N_{AVG} = \frac{\sum_{i=1}^{m} n_i}{m}$$

In accordance with implementations of the present disclosure, when memory is to be allocated, free pages of segments in the dense group are allocated first to provide as many full segments as possible. For example, in response to an allocation request, the segments in the dense group are considered first. In some examples, if a free page is available in a segment, the segment is selected. In some examples, if a dense segment has sufficient space to allocate the requested memory (e.g., the allocation request indicates an amount of memory required), the memory is allocated within the dense segment. If there is not a dense segment with sufficient space to allocate the requested memory, the sparse group for the respective data type is considered. If a sparse segment has sufficient space to allocate the requested memory, the memory is allocated within the sparse segment. If there is not a sparse segment with sufficient space to allocate the requested memory, sparse segments of other data type sub-spaces are considered, as described in further detail herein. In some implementations, if there is no sparse segment across all data types that has sufficient space to allocate the requested memory, a new segment is allocated in the sub-space of the respective data type and a new page in the segment is allocated for storing the data therein (e.g., from the memory allocation group of the respective sub-space).

In some implementations, a segment can be moved between groups. For example, if a dense segment has one or more pages deallocated over time, the dense segment can become a sparse segment and can be moved to the sparse group. As another example, if a sparse segment has a page allocated thereto, the sparse segment can be reevaluated to determine whether it has become a dense segment. If the sparse segment has become a dense segment with the most-recent allocation(s), the segment is moved from the sparse group to the dense group.

In some implementations, and as introduced above, if a dense segment for the respective data type (i.e., the type of the data that is included in the allocation request), the group of sparse segments for the respective data type are considered. For example, if an allocation request is received for data of type A, the dense segment(s) of the sub-space 412 is/are reviewed for storing the data. If there is no dense segment available in the sub-space 412, the sparse segment(s) of the sub-space 412 is/are reviewed. If there is no sparse segment available in the sparse segment(s) of the sub-space 412, sparse segments in the sub-spaces 414, 416, 418 can be reviewed. As described in further detail herein, this can result in a segment storing data of different types (also referred to herein as an impure segment).

Figure 5:
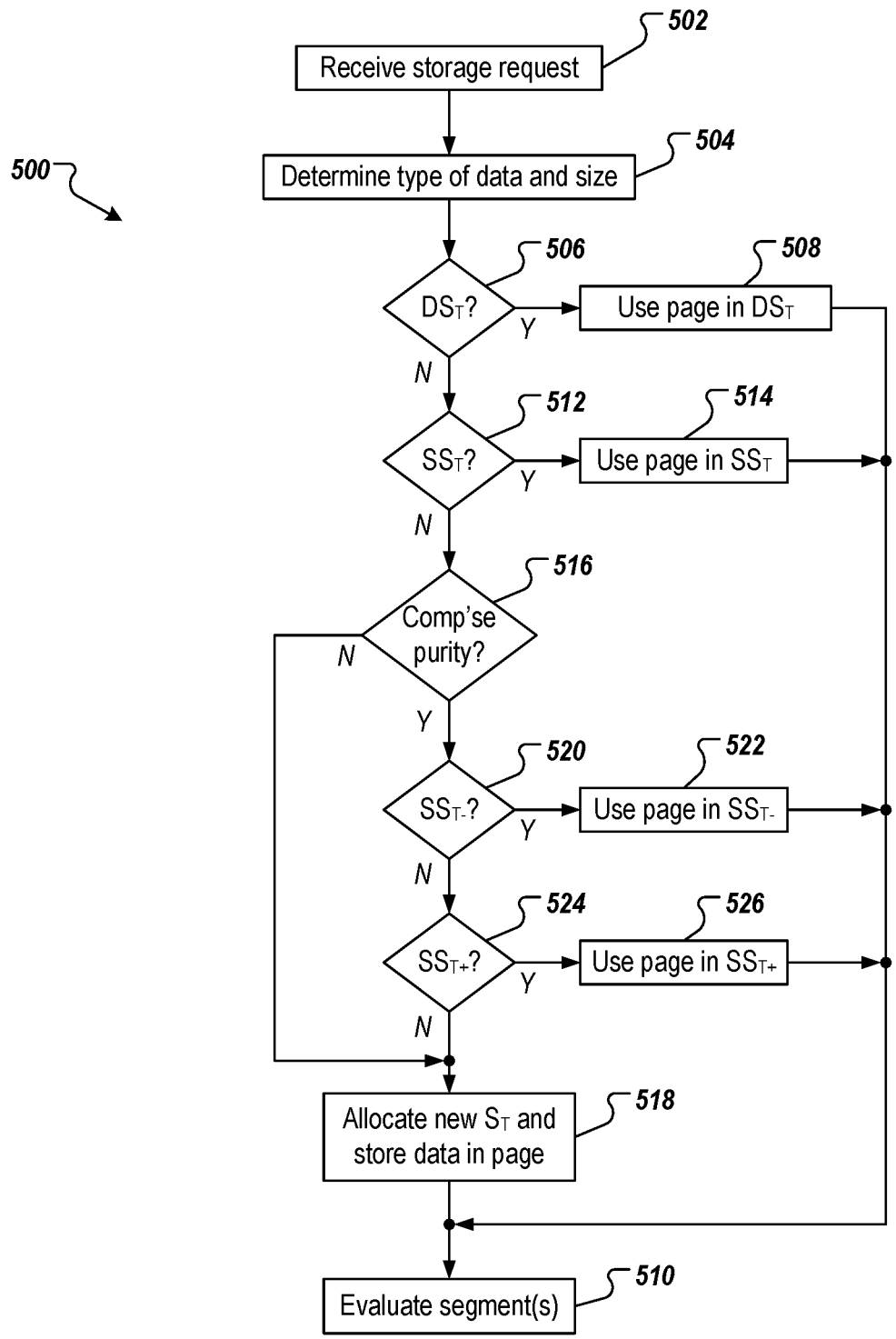
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A storage request is received (502). For example, a storage manager can receive a storage request (e.g., from an application) to store data to memory. In some examples, the storage request includes information that indicates a size of the data and a type (T) of the data (e.g., T=A, B, or C). A type and size of data that is to be stored is determined (504). For example, the storage manager determines the type and the size from the information provided in the storage request.

It is determined whether a dense segment in the sub-space of the type (DST) is available (506). For example, the storage manager determines whether there are any available pages within dense segments of the sub-space of the type T (e.g., a page within a dense segment that has one or more slots available to store the size of the data). If a DST is available, the data is stored in a page of the DST (508). For example, and without limitation, the storage request can indicate data of type A and a size of X kilobytes (kB). In this example, and with reference to FIG. 4, dense segments within the sub-space 412 can be reviewed to determine whether any dense segment has a page that is able to store at least X kB. If there is a dense segment within the sub-space 412 that has a page that is able to store at least X kB, the data is stored in the page.

In some examples, one or more segments are evaluated (510). For example, segments can be evaluated to determine whether to be grouped in the dense group or the sparse group, as described herein. In this manner, segments are reevaluated after a storage event, which could result in a segment moving from one group to another group.

If a DST is not available, it is determined whether a sparse segment in sub-space of the type (SS$_T$) is available (512). For example, the storage manager determines whether there are any available pages within sparse segments of the sub-space of the type T (e.g., a page within a sparse segment that has one or more slots available to store the size of the data). If a SS$_T$ is available, the data is stored in a page of the SS$_T$ (514). Continuing with the above example (e.g., data of type A and a size of X kB), and with reference to FIG. 4, dense segments within the sub-space 412 can be reviewed to determine whether any dense segment has a page that is able to store at least X kB. If there is not a dense segment within the sub-space 412 that has a page that is able to store at least X kB, the sparse segments are reviewed. Continuing with this example, sparse segments within the sub-space 412 can be reviewed to determine whether any sparse segment has a page that is able to store at least X kB. If there is a sparse segment within the sub-space 412 that has a page that is able to store at least X kB, the data is stored in the page. In some examples, one or more segments are evaluated (510).

If a SS$_T$ is not available, it is determined whether purity of a segment can be compromised (516). For example, the storage manager can determine whether the memory has been configured to allow instances of impurity of data types within segments. Impurity of data types means that data of different types are stored in the same segment. In some examples, a configuration parameter can be set that indicates whether purity of data types within segments can be compromised (e.g., 0=purity cannot be compromised, 1=purity can be compromised).

If purity of a segment cannot be compromised, a new segment is allocated in the sub-space of the data type T (S$_T$) and the data is stored in a page of the new segment (518). In some examples, one or more segments are evaluated (510). If purity of a segment can be compromised, it is determined whether a sparse segment in the sub-space of an inferior type (SS$_{T-}$) is available (520). In some examples, the inferior type can be determined based on the order of data types, described above. For example, if the data is of type A, the inferior type (T−) is type B. As another example, if the data is of type B, the inferior type (T−) is type C. As another example, if the data is of type C, there is no inferior type. If a SS$_{T-}$ is available, the data is stored in a page of the SS$_{T-}$ (522). In some examples, one or more segments are evaluated (510).

For example, and without limitation, the storage request can indicate data of type B and a size of X kB. In this example, and with reference to FIG. 4, sparse segments within the sub-space 416 (i.e., for type C) can be reviewed to determine whether any sparse segment has a page that is able to store at least X kB. If there is a sparse segment within the sub-space 416 that has a page that is able to store at least X kB, the data is stored in the page.

If a SS$_{T-}$ is not available, it is determined whether a sparse segment in the sub-space of a superior type (SS$_{T+}$) is available (520). For example, if the data is of type A, there is no superior type (T+). As another example, if the data is of type B, the superior type (T+) is type A. If a SS$_{T+}$ is available, the data is stored in a page of the SS$_{T+}$ (522). In some examples, one or more segments are evaluated (510).

Continuing with the example above (e.g., data of type B and a size of X kB), and with reference to FIG. 4, sparse segments within the sub-space 412 (i.e., for type A) can be reviewed to determine whether any sparse segment has a page that is able to store at least X kB. If there is a sparse segment within the sub-space 412 that has a page that is able to store at least X kB, the data is stored in the page. If a SS$_{T+}$ is not available, a new segment is allocated in the sub-space of the data type T (S$_T$) and the data is stored in a page of the new segment (518).

Implementations of the present disclosure achieve one or more of the following example advantages. For example, implementations of the present disclosure enable an optimized defragmentation process. Because, separate lists of segments are provided for each data type (A, B, C), the defragmentation process of each data type has different points of optimization. That is, the defragmentation process can be optimized for respective data types instead of being generic to all data types (i.e., not optimized for any particular data type).

Further, grouping the segments into dense, sparse, and minimum allocation groups enhances performance of the defragmentation process by reducing the size of data to move during defragmentation. This is because the standard deviation of the number of free pages in the segments will increase, because dense segments are picked first. More particularly, implementations of the present disclosure result in the denser segments to become denser and denser over time, because the free pages of the dense segments are consumed first. On the other hand, sparser segments have more chance to get free pages by deletion, because the sparse segments are not used until all denser segments become full. As a result, sparser segments tend to store pages that are less frequently used, which reduces the number of pages to move during the defragmentation. That is, during defragmentation, there are less pages to move from the sparser segments to the denser segments.

Also, the minimum allocation group of the present disclosure improves the defragmentation process. More particularly, defragmentation can take advantage of the minimum allocation group in terms of keeping information about the segment during the previous defragmentation process. The performance of the next defragmentation process can be enhanced by setting minimum allocation part to the segments that are likely to be freed in the next defragmentation process and retrying defragmentation if the previous defragmentation fails. It makes the status of the segments as unchanged as possible to use the information from the previous defragmentation process.

In addition, implementations of the present disclosure improve memory utilization, by consuming the free pages of denser segments first. Because the denser segments are consumed first, sparser segments are not used for a longer period of time. This results in more opportunity for the sparse segments to be emptied by deletion and to be deallocated. Additionally, as the effect of consuming the free pages of denser segments, denser segments have more chance to be full segments. This leads to the increase of memory utilization and reduces the need to conduct defragmentation. That is, implementations of the present disclosure result in defragmentation being performed less frequently.

Figure 6:
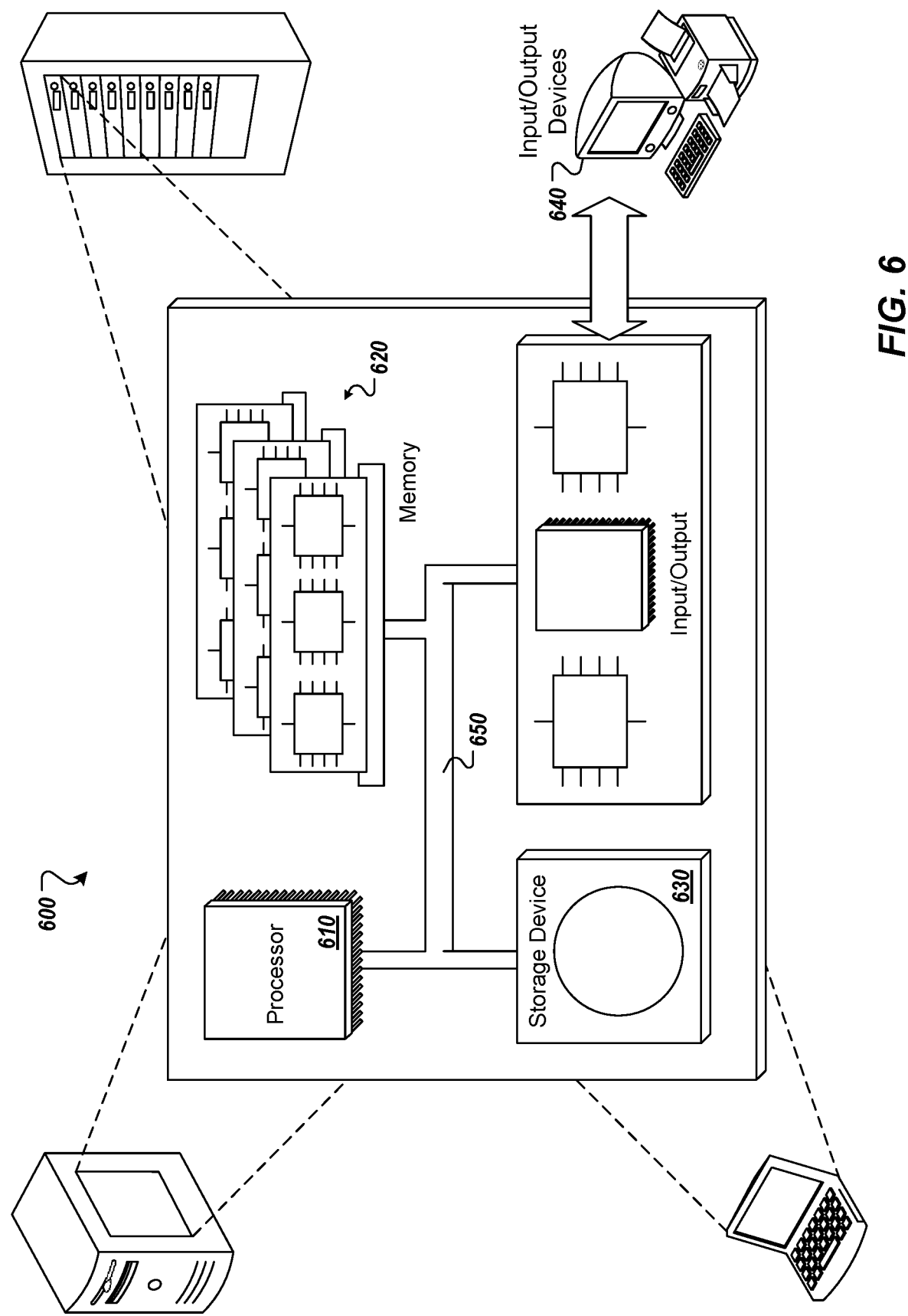
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for memory management in database systems, the method being executed by one or more processors and comprising:
   receiving a first storage request to store data in computer-memory, the first storage request indicating a first type of data of a plurality of types of data and a first size, the types of data comprising data that has a fixed length, data that has a variable length and include metadata identifying an owner of the data, data that has a variable length and is absent metadata identifying an owner of the data, and miscellaneous data that is not used in transactions;
   identifying a first sub-space of a plurality of sub-spaces based on the first type, the first sub-space comprising a dense group of dense segments and a sparse group of sparse segments; and
   determining that the dense group of the first sub-space is absent a dense segment to store data of the first storage request based on the first size, and in response:
      determining whether the sparse group of the first sub-space comprises a sparse segment to store the data of the first storage request based on the first size, and
      storing the data of the first storage request to the sparse group of the first sub-space in response to determining that the sparse group of the first sub-space comprises a sparse segment to store the data of the first storage request.

2. The method of claim 1, further comprising:
   receiving a second storage request to store data in the computer-memory, the second storage request indicating the first type and a second size;
   identifying the first sub-space of a plurality of sub-spaces based on the first type; and
   determining that the dense group of the first sub-space is absent a dense segment to store data of the second storage request based on the second size and that the first sub-space is absent a sparse segment to store the data of the second storage request based on the second size, and in response:
      determining whether a sparse group of a second sub-space in the plurality of sub-spaces comprises a sparse segment to store the data of the second storage request based on the second size, and
      storing the data of the second storage request to the sparse group of the second sub-space in response to determining that the sparse group of the second sub-space comprises a sparse segment to store the data of the second storage request.

3. The method of claim 2, wherein the second sub-space is associated with a second type of data, the second type being inferior to the first type in a type order.

4. The method of claim 2, wherein the second sub-space is associated with a second type of data, the second type being superior to the first type in a type order.

5. The method of claim 1, further comprising:
   receiving a third storage request to store data in the computer-memory, the third storage request indicating the first type and a third size;
   identifying the first sub-space of a plurality of sub-spaces based on the first type; and
   determining that the first sub-space is absent a segment to store data of the third storage request based on the third size, and in response:
      determining whether a sparse segment in one or more other sub-spaces of the plurality of sub-spaces is able to store the data of the third storage request based on the third size, and
      determining that each of the one or more other sub-spaces is absent a sparse segment to store the data of the third storage request, and in response:
         allocating a segment and a page in the first sub-space to store the data of the third storage request.

6. The method of claim 1, further comprising identifying a segment as one of a dense segment and a sparse segment based on a ratio of a number of used pages in the segment and a number of free pages.

7. The method of claim 6, wherein the number of available pages comprises an average number of free pages across all segments in a sub-space.

8. A non-transitory computer-readable storage medium coupled to one or more processors and having instructions stored thereon which, when executed by the one or more processors, cause the one or more processors to perform operations for memory management in database systems, the operations comprising:
   receiving a first storage request to store data in computer-memory, the first storage request indicating a first type of data of a plurality of types of data and a first size, the types of data comprising data that has a fixed length, data that has a variable length and include metadata identifying an owner of the data, data that has a variable length and is absent metadata identifying an owner of the data, and miscellaneous data that is not used in transactions;
   identifying a first sub-space of a plurality of sub-spaces based on the first type, the first sub-space comprising a dense group of dense segments and a sparse group of sparse segments; and determining that the dense group of the first sub-space is absent a dense segment to store data of the first storage request based on the first size, and in response:
  determining whether the sparse group of the first sub-space comprises a sparse segment to store the data of the first storage request based on the first size, and
  storing the data of the first storage request to the sparse group of the first sub-space in response to determining that the sparse group of the first sub-space comprises a sparse segment to store the data of the first storage request.

9. The computer-readable storage medium of claim 8, wherein operations further comprise:
receiving a second storage request to store data in the computer-memory, the second storage request indicating the first type and a second size;
identifying the first sub-space of a plurality of sub-spaces based on the first type; and determining that the dense group of the first sub-space is absent a dense segment to store data of the second storage request based on the second size and that the first sub-space is absent a sparse segment to store the data of the second storage request based on the second size, and in response:
  determining whether a sparse group of a second sub-space in the plurality of sub-spaces comprises a sparse segment to store the data of the second storage request based on the second size, and
  storing the data of the second storage request to the sparse group of the second sub-space in response to determining that the sparse group of the second sub-space comprises a sparse segment to store the data of the second storage request.

10. The computer-readable storage medium of claim 9, wherein the second sub-space is associated with a second type of data, the second type being inferior to the first type in a type order.

11. The computer-readable storage medium of claim 9, wherein the second sub-space is associated with a second type of data, the second type being superior to the first type in a type order.

12. The computer-readable storage medium of claim 8, wherein operations further comprise:
receiving a third storage request to store data in the computer-memory, the third storage request indicating the first type and a third size;
identifying the first sub-space of a plurality of sub-spaces based on the first type; and determining that the first sub-space is absent a segment to store data of the third storage request based on the third size, and in response:
  determining whether a sparse segment in one or more other sub-spaces of the plurality of sub-spaces is able to store the data of the third storage request based on the third size, and
  determining that each of the one or more other sub-spaces is absent a sparse segment to store the data of the third storage request, and in response:
    allocating a segment and a page in the first sub-space to store the data of the third storage request.

13. The computer-readable storage medium of claim 8, wherein operations further comprise identifying a segment as one of a dense segment and a sparse segment based on a ratio of a number of used pages in the segment and a number of free pages.

14. The computer-readable storage medium of claim 13, wherein the number of available pages comprises an average number of free pages across all segments in a sub-space.

15. A system, comprising:
a computing device; and
a computer-readable storage device coupled to the computing device and having instructions stored thereon which, when executed by the computing device, cause the computing device to perform operations for memory management in database systems, the operations comprising:
  receiving a first storage request to store data in computer-memory, the first storage request indicating a first type of data of a plurality of types of data and a first size, the types of data comprising data that has a fixed length, data that has a variable length and include metadata identifying an owner of the data, data that has a variable length and is absent metadata identifying an owner of the data, and miscellaneous data that is not used in transactions;
  identifying a first sub-space of a plurality of sub-spaces based on the first type, the first sub-space comprising a dense group of dense segments and a sparse group of sparse segments; and
  determining that the dense group of the first sub-space is absent a dense segment to store data of the first storage request based on the first size, and in response:
    determining whether the sparse group of the first sub-space comprises a sparse segment to store the data of the first storage request based on the first size, and
    storing the data of the first storage request to the sparse group of the first sub-space in response to determining that the sparse group of the first sub-space comprises a sparse segment to store the data of the first storage request.

16. The system of claim 15, wherein operations further comprise:
receiving a second storage request to store data in the computer-memory, the second storage request indicating the first type and a second size;
identifying the first sub-space of a plurality of sub-spaces based on the first type; and
determining that the dense group of the first sub-space is absent a dense segment to store data of the second storage request based on the second size and that the first sub-space is absent a sparse segment to store the data of the second storage request based on the second size, and in response:
  determining whether a sparse group of a second sub-space in the plurality of sub-spaces comprises a sparse segment to store the data of the second storage request based on the second size, and
  storing the data of the second storage request to the sparse group of the second sub-space in response to determining that the sparse group of the second sub-space comprises a sparse segment to store the data of the second storage request.

17. The system of claim 16, wherein the second sub-space is associated with a second type of data, the second type being inferior to the first type in a type order.

18. The system of claim 16, wherein the second sub-space is associated with a second type of data, the second type being superior to the first type in a type order.

19. The system of claim 15, wherein operations further comprise:
receiving a third storage request to store data in the computer-memory, the third storage request indicating the first type and a third size;

identifying the first sub-space of a plurality of sub-spaces based on the first type; and determining that the first sub-space is absent a segment to store data of the third storage request based on the third size, and in response:

determining whether a sparse segment in one or more other sub-spaces of the plurality of sub-spaces is able to store the data of the third storage request based on the third size, and determining that each of the one or more other sub-spaces is absent a sparse segment to store the data of the third storage request, and in response:

allocating a segment and a page in the first sub-space to store the data of the third storage request.

20. The system of claim 15, wherein operations further comprise identifying a segment as one of a dense segment and a sparse segment based on a ratio of a number of used pages in the segment and a number of free pages.

* * * * *